US008799638B2

(12) United States Patent
Ogata et al.

(10) Patent No.: US 8,799,638 B2
(45) Date of Patent: Aug. 5, 2014

(54) COMMUNICATION SYSTEM, COMMUNICATION DEVICE, AND COMMUNICATION METHOD WITH A SECURITY POLICY FOR COMMUNICATION BETWEEN DEVICES

(75) Inventors: Hideaki Ogata, Yokohama (JP); Yoichi Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 13/077,528

(22) Filed: Mar. 31, 2011

(65) Prior Publication Data

US 2012/0079266 A1 Mar. 29, 2012

(30) Foreign Application Priority Data

Apr. 1, 2010 (JP) ................................ 2010-084806

(51) Int. Cl.

*H04L 29/06* (2006.01)
*H04L 9/16* (2006.01)
*G06F 21/60* (2013.01)

(52) U.S. Cl.

CPC .............. *H04L 63/0428* (2013.01); *H04L 9/16* (2013.01); *G06F 21/608* (2013.01); *H04L 63/20* (2013.01)
USPC ............................................... 713/150; 726/1

(58) Field of Classification Search

CPC ....... H04L 63/0428; H04L 9/16; H04L 63/20; G06F 21/608
USPC ............................................... 713/150; 726/1
See application file for complete search history.

(56) References Cited

U.S. PATENT DOCUMENTS

| | | | | |
|---|---|---|---|---|
| 6,832,314 | B1 * | 12/2004 | Irvin | 713/162 |
| 2002/0146127 | A1 * | 10/2002 | Wong | 380/270 |
| 2005/0066197 | A1 | 3/2005 | Hirata et al. | |
| 2006/0161960 | A1 * | 7/2006 | Benoit | 725/105 |
| 2006/0200678 | A1 * | 9/2006 | Yamada et al. | 713/182 |
| 2007/0186009 | A1 * | 8/2007 | Guichard et al. | 709/238 |
| 2008/0109660 | A1 * | 5/2008 | Mitra | 713/190 |
| 2008/0141372 | A1 * | 6/2008 | Massey et al. | 726/23 |
| 2008/0155273 | A1 * | 6/2008 | Conti | 713/190 |
| 2009/0007224 | A1 * | 1/2009 | Aso et al. | 726/1 |
| 2009/0202079 | A1 * | 8/2009 | Puputti et al. | 380/279 |
| 2010/0050240 | A1 * | 2/2010 | Conway et al. | 726/4 |
| 2011/0072276 | A1 * | 3/2011 | Lee et al. | 713/189 |

FOREIGN PATENT DOCUMENTS

| | | | |
|---|---|---|---|
| JP | 2005-101741 | A | 4/2005 |
| JP | 2008-052645 | A | 3/2008 |

* cited by examiner

*Primary Examiner* — Michael Pyzocha
(74) *Attorney, Agent, or Firm* — Maschoff Brennan

(57) ABSTRACT

A first communication device includes a security policy storing unit that store a security policy and a default policy applied to communication to which the security policy is not applied, a communication unit that performs communication, and a communication control unit that performs an encryption process and a decryption process according to the default policy when the communication does not correspond to the target of the policy. A second communication device includes an input and output receiving processing unit that receives an input of an encryption key of the default policy of the first communication device, a communication control unit that generates a policy including an encryption method of the default policy and the input encryption key and performs an encryption process and a decryption process in communication with the first communication device according to the policy, and a communication unit that performs communication of a communication packet.

7 Claims, 4 Drawing Sheets

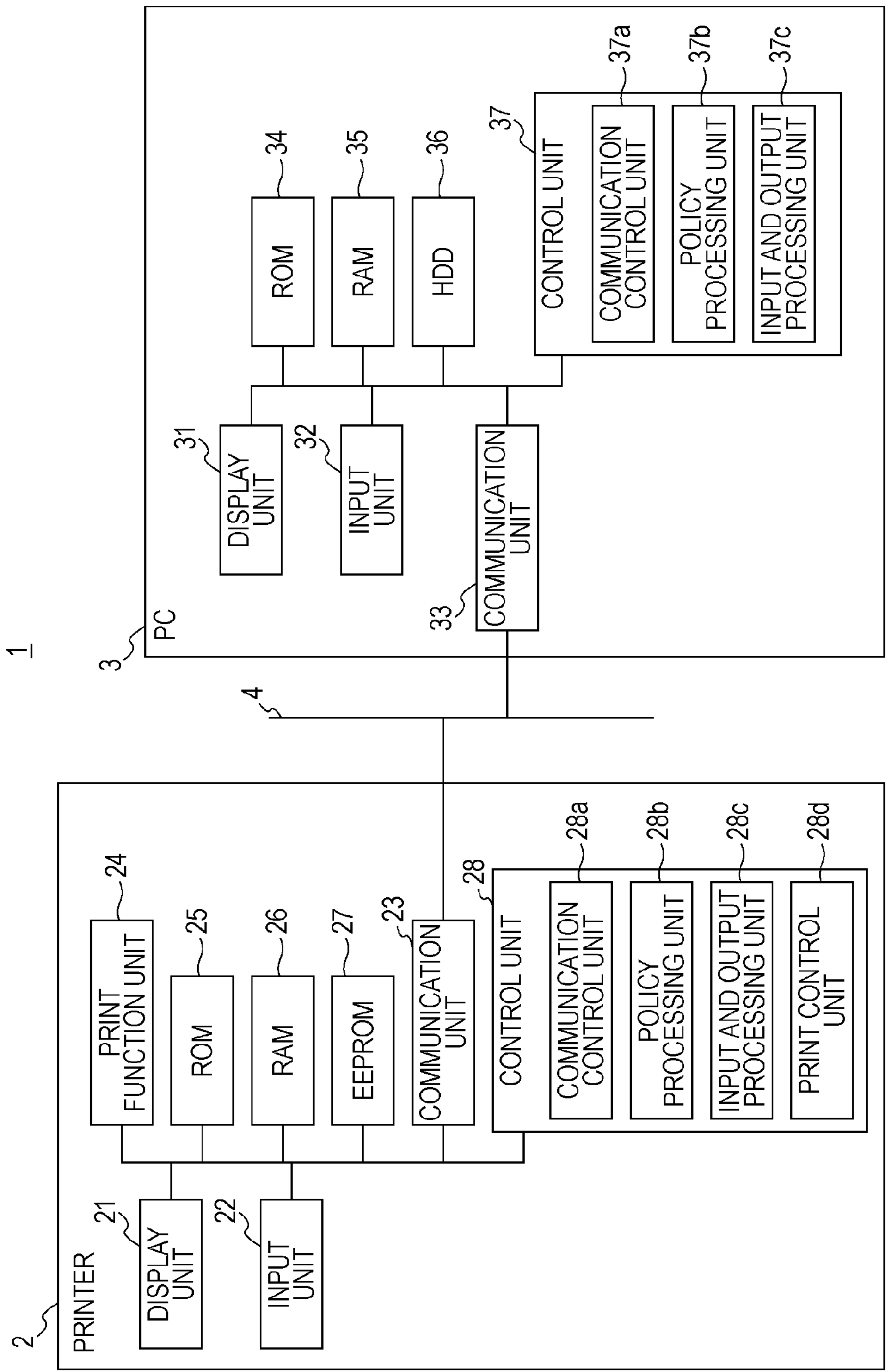
FIG. 1
1
3
PC
DISPLAY UNIT
31
INPUT UNIT
32
COMMUNICATION UNIT
33
ROM
34
RAM
35
HDD
36
CONTROL UNIT
37
COMMUNICATION CONTROL UNIT
37a
POLICY PROCESSING UNIT
37b
INPUT AND OUTPUT PROCESSING UNIT
37c
4
2
PRINTER
DISPLAY UNIT
21
INPUT UNIT
22
PRINT FUNCTION UNIT
24
ROM
25
RAM
26
EEPROM
27
COMMUNICATION UNIT
23
CONTROL UNIT
28
COMMUNICATION CONTROL UNIT
28a
POLICY PROCESSING UNIT
28b
INPUT AND OUTPUT PROCESSING UNIT
28c
PRINT CONTROL UNIT
28d 270
ASSESSMENT SEQUENCE
SECURITY POLICY 1
SECURITY POLICY 2
SECURITY POLICY 3
SECURITY POLICY N
271
DEFAULT SECURITY POLICY
272
PACKET SELECTOR
PACKET APPLICATION PROCESS
CERTIFICATION KEY (PASSPHRASE)
ENCRYPTION PARAMETER
271a
271b
271c
271d
IP ADDRESS
PORT NUMBER
PROTOCOL
271a-1
271a-2
271a-3
PASS/BLOCK/ ENCRYPTION
271b-1
272a
272b
272c
272a-1

COMMUNICATION SYSTEM, COMMUNICATION DEVICE, AND COMMUNICATION METHOD WITH A SECURITY POLICY FOR COMMUNICATION BETWEEN DEVICES

BACKGROUND

1. Technical Field

The present invention relates to a communication system, a communication device, and a communication method, in which communication is performed on the basis of a set security policy.

2. Related Art

A communication device such as a PC (Personal Computer) or a printer performs, for example, communication on a network using data as an IP (Internet Protocol) packet.

In recent years, an IPsec (Security Architecture for Internet Protocol) has become known as a protocol securing security in communication on a network. In a communication device capable of using IPsec, it is determined whether or not there is a security policy applicable to communication. When there is an applicable security policy, an encryption process is performed according to the security policy applicable to a packet of a transmission target or a decryption process is performed according to a security policy applicable to a received communication packet (IPsec Packet).

As a technique relating to the IPsec, for example, a technique of applying a different security policy for every phase in device control protocols is disclosed (for example, JP-A-2005-101741).

In a communication device capable of using the IPsec, when there is a security policy applicable to communication, an encryption process or the like is performed according to the security policy. However, when there is no applicable security policy, communication is performed according to a preset default security policy.

In the default security policy, whether the packet used in communication is allowed to pass (the packet is transmitted at the time of transmitting the packet, and the packet is input to the inside of the device at the time of receiving the packet) or the packet is blocked is set.

To perform encryption communication using a communication device when the communication device capable of using such an IPsec is newly connected to a network, it is necessary to set the security policy applicable to communication with a communication target device in detail. Accordingly, it is difficult for an unskilled user to set the security policy, and effort is taken up.

SUMMARY

An advantage of some aspects of the invention is to provide a technique capable of easily and appropriately securing a security in communication.

According to a first aspect of the invention, there is provided a communication system comprising a first communication device and a second communication device connected through a network, the first communication device and the second communication device performing a communication process on the basis of a security policy set for each device, wherein the first communication device includes a security policy storing unit that is able to store a first security policy including an encryption method and an encryption key applied to predetermined communication with a predetermined communication device in a predetermined communication target range and a second security policy including an encryption method and an encryption key applied to all communication to which the first security policy in the communication target range is not applied, a first communication unit that performs communication of a communication packet with other communication devices through the network, and a first encryption processing unit that performs an encryption process on the transmitted communication packet and a decryption process of the received communication packet according to the second security policy when the communication with other communication devices does not correspond to the target to which the first security policy is applied, and wherein the second communication device includes a first encryption key receiving unit that receives an input of the encryption key stored in the second security policy of the first communication device, a policy generating unit that generates a third security policy including the encryption method of the second security policy and the input encryption key, a second encryption processing unit that performs an encryption process on the communication packet transmitted to the first communication device and a decryption process of the communication packet received from the first communication device according to the third security policy, and a second communication unit that performs communication of the communication packet with the first communication device through the network.

According to the communication system, in the first communication device, the encryption process on the communication packet used in the communication with the second communication device and the decryption process of the communication packet are performed using the encryption key and the encryption method stored in the second security policy, and in the second communication device, the encryption process on the communication packet transmitted to the first communication device and the decryption process of the communication packet are performed using the input encryption key and the encryption method of the second security policy. For this reason, it is possible to perform the encryption communication between the first communication device and the second communication device, and it is possible to secure the security. The encryption key may be stored in the first communication device. Accordingly, in the first communication device, it is not necessary for a user to set the security policy for communication with the second communication device in detail, and it is possible to easily perform the encryption communication.

In the communication system, it is preferable that the first communication device further includes a second encryption key receiving unit that receives an input of the encryption key of the second security policy from a user. According to the communication system, the first communication device receives the input of the encryption key from the user, and thus the user can input an arbitrary encryption key. For this reason, it is possible to appropriately prevent the encryption key from being disclosed to another user.

In the communication system, it is preferable that the second communication device further includes a policy information receiving unit that receives policy information prescribing the security policy stored in the first communication device from a user, the second encryption processing unit generates a communication packet obtained by performing an encryption process on the packet including the policy information according to the third security policy, the second communication unit transmits the generated communication packet to the first communication device, the first communication unit of the first communication device receives the communication packet, the first encryption processing unit generates a packet obtained by decryption the received communication packet according to the second security policy, and the first communication device further includes a policy generating unit that generates a security policy applied to communication with the second communication device as one of the first security policies on the basis of the policy information included in the decrypted packet. According to the communication system, the policy information is transmitted from the second communication device to the first communication device with respect to the encrypted communication packet, and thus it is possible to appropriately prevent the policy information from being leaked. In the first communication device, since the first security policy is set on the basis of the policy information, it is possible to easily set the security policy applied to the communication with the second communication device.

In the communication system, it is preferable that the first encryption processing unit of the first communication device does not perform the encryption process on the transmitted communication packet and the decryption process of the received communication packet, when the encryption key is not stored as the second security policy and the communication with other communication devices does not correspond to the target to which the first security policy is applied. According to the communication system, since the encryption process and the decryption process are not performed when the encryption key is not stored, it is possible to allow the packet to pass or to be blocked.

In the communication system, it is preferable that the second security policy is a security policy in which an applicable communication device is not limited. According to the communication system, since the applicable communication device is not limited, it is possible to appropriately apply the second security policy to any communication device irrespective of the inside or the outside of the communication target range.

In the communication system, it is preferable that the second security policy is a security policy applicable to all communication devices in the communication target range. According to the communication system, even in any communication device in the communication target range, it is possible to appropriately apply the second security policy when the first security policy is not applied.

According to a second aspect of the invention, there is provided a communication device performing communication with other communication devices through a network, including: a security policy storing unit that is able to store a first security policy including an encryption method and an encryption key applied to predetermined communication with a predetermined communication device in a predetermined communication target range and a second security policy including an encryption method and an encryption key applied to all communication to which the first security policy in the communication target range is not applied; a first communication unit that performs communication of a communication packet with other communication devices; and a first encryption processing unit that performs an encryption process on the transmitted communication packet and a decryption process of the received communication packet according to the second security policy when the communication with other communication devices does not correspond to the target to which the first security policy is applied. According to the communication device, it is possible to appropriately perform the encryption communication in the communication with the communication device to which the first security policy is not applied.

According to a third aspect of the invention, there is provided a communication method in a communication system including a first communication device and a second communication device connected through a network, the first communication device and the second communication device performing a communication process on the basis of a security policy set for each device, wherein the first communication device includes a security policy storing unit that is able to store a first security policy including an encryption method and an encryption key applied to predetermined communication with a part of predetermined communication devices in a predetermined communication target range and a second security policy including an encryption method and an encryption key applied to all communication to which the first security policy in the communication target range is not applied, the communication method comprising: receiving an input of the encryption key stored in the second security policy of the first communication device by a first encryption key receiving unit of the second communication device; generating a third security policy including the address information of the second communication device and the encryption method of the second security policy of the second communication device and the input encryption key by a policy generating unit of the second communication device; performing an encryption process on the communication packet transmitted to the first communication device and a decryption process of the communication packet received from the first communication device according to the third security policy by a second encryption processing unit of the second communication device; performing communication of the communication packet with the first communication device through the network by a second communication unit of the second communication device; performing communication of the communication packet with the first communication device through the network by a first communication unit of the first communication device; and performing the encryption process on the transmitted communication packet and the decryption process of the received communication packet according to the second security policy by a first encryption processing unit of the first communication device, when the communication with the second communication device does not correspond to the target to which the first security policy is applied.

According to the communication method, in the first communication device, the encryption process on the communication packet used in the communication with the second communication device and the decryption process of the communication packet are performed using the encryption key and the encryption method stored in the second security policy, and in the second communication device, the encryption process on the communication packet transmitted to the first communication device and the decryption process of the communication packet are performed using the input encryption key and the encryption method of the second security policy. For this reason, it is possible to perform the encryption communication between the first communication device and the second communication device, and it is possible to secure the security. The encryption key may be stored in the first communication device. Accordingly, in the first communication device, it is not necessary for a user to set the security policy for communication with the second communication device in detail, and it is possible to easily perform the encryption communication.

BRIEF DESCRIPTION OF THE DRAWINGS

The invention will be described with reference to the accompanying drawings, wherein like numbers reference like elements.

FIG. 1 is a diagram illustrating a configuration of an example of a communication system according to an embodiment of the invention.

DESCRIPTION OF EXEMPLARY EMBODIMENTS

Figure 2:
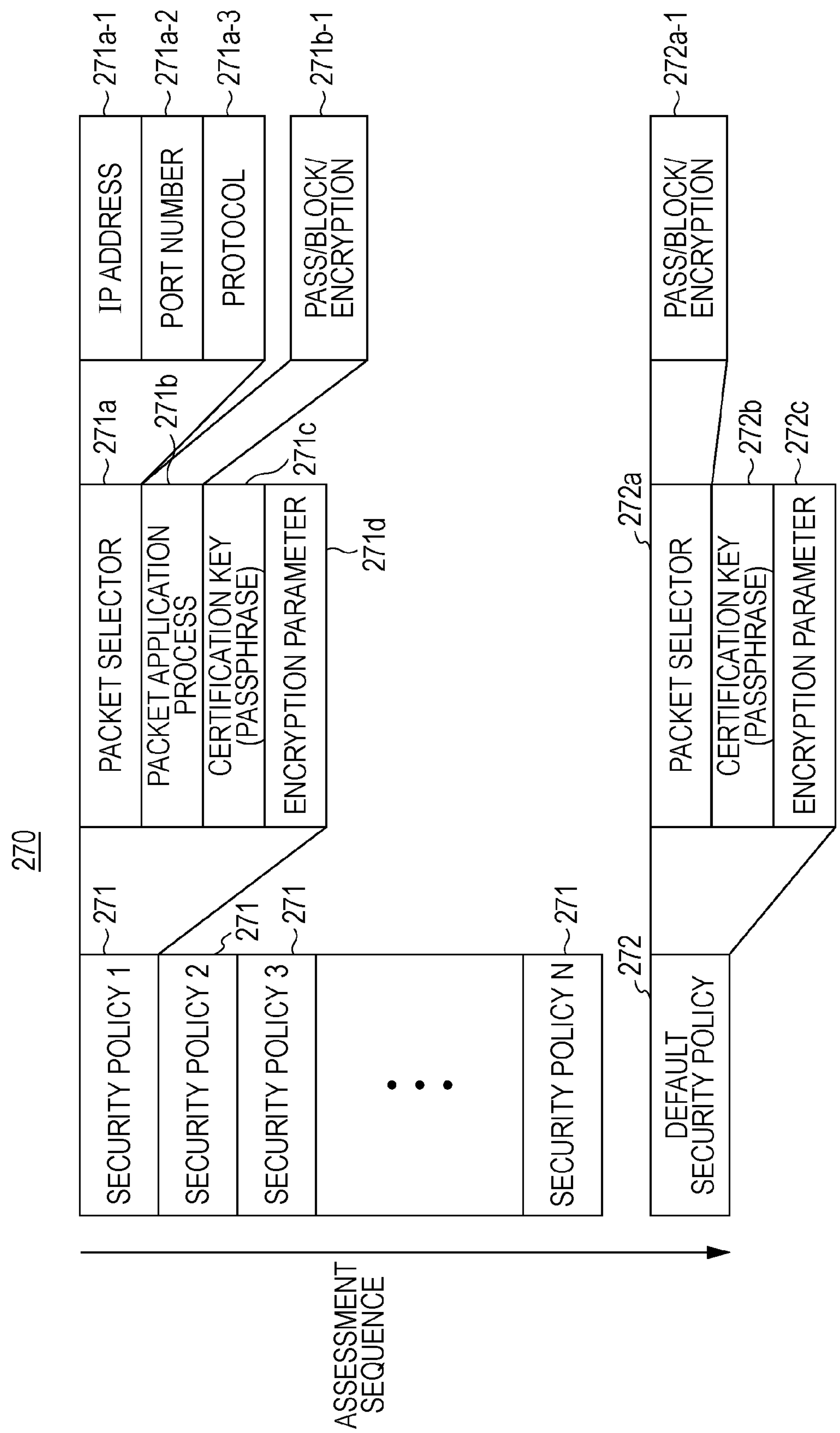
FIG. 2 is a diagram illustrating a security policy table according to an embodiment of the invention.

Embodiments of the invention will be described with reference to the drawings. The embodiments described hereinafter do not limit the invention according to the Claims, and all the elements and compositions described in the embodiments are not essential for the resolution means of the invention.

First, a communication system according to an embodiment of the invention will be described.

FIG. 1 is a diagram illustrating a configuration of an example of the communication system according to an embodiment of the invention.

In the communication system 1, a printer 2 as an example of a first communication device and one or more personal computers (PC) 3 as an example of a second communication device are connected through a network 4. The network 4 may include lines or be wireless, and may include the internet.

The printer 2 includes a display unit 21, an input unit 22, a communication unit 23 as an example of a first communication unit, a print function unit 24, a ROM (Read Only Memory) 25, a RAM (Random Access Memory) 26, an EEPROM (Electrically Erasable Programmable ROM) 27 as an example of a security policy storing unit, and a control unit 28.

The display unit 21 includes, for example, a liquid crystal screen to display various kinds of information. The input unit 22 includes, for example, a key unit, a touch panel unit, and the like to receive an input such as various instructions from a user. The input unit 22 receives, for example, an input of a certification key (password or encryption key) used in an encryption method of setting to a default security policy of the printer 2. The communication unit 23 performs a transmission or reception process of data to and from other devices through the network 4. In the embodiment, the communication unit 23 performs communication through the network 4 using an IP (Internet Protocol) packet (for example, also including an encrypted IPsec packet). The print function unit 24 forms (prints) an image on an image forming medium such as paper or an OHP sheet.

The ROM 25 stores a boot program and programs of various processes to be described later. The RAM 26 is used as an area for storing programs and data, or a work area for storing data used in a process performed by the control unit 28. EEPROM 27 is a rewritable non-volatile memory, and stores various kinds of information, which have to be stored even when power is not supplied to the printer 2. In the embodiment, the EEPROM 27 stores a security policy used in IPsec, and a security policy table (see FIG. 2) managing a default security policy.

FIG. 2 is a diagram illustrating the security policy table according to an embodiment of the invention.

In the security policy table 270, N (0 or an integer of 1 or more) security policies 271 (first security policies) and one default security policy 272 (an example of a second security policy) are managed.

The security policy 271 includes a packet selector 271*a*, packet application processing information 271*b*, a certification key (password or passphrase) 271*c*, and an encryption parameter 271*d*. The packet selector 271*a* is information prescribing communication (specifically, packet) to which the corresponding security policy is applied, and specifically, includes an IP address 271*a*-1 of the communication target device of the packet, a port number 271*a*-2 of the communication target device, and a protocol 271*a*-3 using the packet. The packet application processing information 271*b* is information prescribing the applied process on the packet to which the corresponding security policy is applied, for example, one of pass indicating that the packet is allowed to pass, block indicating that the packet is blocked, and encryption indicating that the packet is encrypted and decrypted, is set. The certification key 271*c* is a certification key (password) used when performing the encryption process and the decryption process. The encryption parameter 271*d* is a parameter indicating a method of encryption (encryption method: encryption algorithm). As the parameter of the encryption method, for example, there are DES-CBC, 3DES-CBC, CAST-128, RC-5, IDEA, or the like.

The default security policy 272 is a policy applied to communication to which all the security policies 271 are not applied, and includes packet application process information 272*a*, a certification key (referred to also as encryption key, password, and passphrase) 272*b*, and an encryption parameter 272*c*. In the embodiment, the default security policy 272 is a policy in which an applicable communication device is not limited to a communication device in a communication target range (range of IP address). The packet application process information 272*a* is information prescribing a process applied to the application target packet of the corresponding security policy, for example, one of pass indicating that the packet is allowed to pass, block indicating that the packet is blocked, and encryption indicating that the packet is encrypted and decrypted, is set. In the embodiment, the encryption is set as an initial set value of the packet application process information 272*a*. The certification key 272*b* is a certification key (password) used when performing the encryption process and the decryption process. In the embodiment, an initial set value of the certification key 272*b* is blank, and then the value is set when there is a setting by a user. The encryption parameter 272*c* is a parameter indicating a method of encryption (encryption method: encryption algorithm). In the embodiment, as the parameter of the encryption method, for example, DES-CBC is set.

Returning to the description of FIG. 1, the control unit 28 includes a communication control unit 28*a* as an example of a first encryption processing unit, a policy processing unit 28*b* as an example of a policy generating unit, an input and output processing unit 28*c* as an example of a second encryption key receiving unit, and a print control unit 28*d*. The communication control unit 28*a*, the policy processing unit 28*b*, the input and output processing unit 28*c*, and the print control unit 28*d* are configured, for example, by executing programs stored in the ROM 25 or the like by a CPU (Central Processing Unit) as an example of the control unit 28.

The communication control unit 28*a* controls the communication unit 23 to perform communication through the network 4. The communication control unit 28*a* performs a process (packet process) on a transmission target packet (or a reception target packet) according to a policy (security policy or default security policy) reported by the policy processing unit 28*b*. That is, the communication control unit 28*a* performs a process corresponding to the setting of the packet application process information 271*b* (or 272*a*) of the reported policy 271 (or 272).

Specifically, when the packet application process information 271*b* (or 272*a*) of the policy 271 (or 272) indicates the pass, the communication control unit 28*a* transmits the packet through the communication unit 23 when the packet is the transmission target packet, and receives the packet from the communication unit 23 to be usable in the process in the printer 2 when the packet is the reception target packet. When the packet application process information 271*b* (or 272*a*) of the policy 271 (or 272) indicates the block, the communication control unit 28*a* breaks the packet when the packet is the transmission target packet, and allows the communication unit 23 to break the packet when the packet is the reception target packet. When the packet application process information 271*b* (or 272*a*) of the policy 271 (or 272) indicates the encryption, the communication control unit 28*a* encrypts the packet using the certification key 271*c* (or 272*b*) by the encryption method indicated by the encryption parameter 271*d* (or 272*c*) and transmits it through the communication unit 23 when the packet is the transmission target packet, and the communication control unit 28*a* receives the packet from the communication unit 23 and decrypts the packet using the certification key 271*c* (or 272*b*) by the encryption method indicated by the encryption parameter 271*d* (272*c*) to use the decrypted packet in the process when the packet is the reception target packet. For example, when the packet is a reception packet including policy information that is various settings of the security policy for a web page for security policy setting to be described later, the communication control unit 28*a* transmits the packet including the policy information to the policy processing unit 28*b* to be usable in the process.

When the packet application process information 272*a* of the default security policy 272 indicates the encryption and the certification key 272*b* is blank, the communication control unit 28*a* determines that it is not designated to be encrypted by the user. When the packet is the transmission target packet, the communication control unit 28*a* does not encrypt the packet and transmits the packet through the communication unit 23. When the packet is the reception target packet, the communication control unit 28*a* receives the packet from the communication unit 23 to allow the packet to be usable in the process without decryption.

When the packet is transmitted from the printer 2 and when the communication unit 23 receives the packet from the network 4, the policy processing unit 28*b* determines a policy (whether it is one of the security policies 271 or the default security policy 272) applied to the corresponding packet and reports the determination to the communication control unit 28*a*. In the embodiment, the policy processing unit 28*b* determines whether or not the security policies 271 are applicable in order from the top (sequentially from the security policy 1 shown in FIG. 2). When there is an applicable policy, the policy processing unit 28*b* reports it to the communication control unit 28*a*. When any security policies 271 are not applicable, the policy processing unit 28*b* reports the default security policy 272 as the applicable policy to the communication control unit 28*a*.

Specifically, the policy processing unit 28*b* specifies the IP address, the port number, and the protocol of the communication target device for the transmission target packet or the packet received by the communication unit 23, and determines whether or not there is the security policy 271 including the packet selector 271*a* with the content corresponding thereto. When there is the security policy 271 including the packet selector 271*a* with the corresponding content, the policy processing unit 28*b* reports the security policy 271 as the applied policy to the communication control unit 28*a*. Meanwhile, when there is no packet selector 271*a* with the corresponding content in any security policies 271, the policy processing unit 28*b* reports the default security policy 272 as the applied policy to the communication control unit 28*a*.

When the policy processing unit 28*b* receives the certification key in the default security policy from the input and output processing unit 28*c*, the policy processing unit 28*b* sets the received certification key as the certification key 272*b* of the default security policy 272 of the security policy table 270.

When the policy processing unit 28*b* receives the various settings for a new security policy from the input and output processing unit 28*c*, the policy processing unit 28*b* newly sets the received security policy of the various settings as the security policy 271 of the security policy table 270.

The policy processing unit 28*b* allows the communication control unit 28*a* to transmit the web page for security policy setting in the printer 2 to another device such as a PC 3. When the policy processing unit 28*b* receives the various settings (policy information) of the security policy about the web page for security policy setting from the communication control unit 28*a*, the policy processing unit 28*b* newly sets the security policy corresponding to the setting as the security policy 271 of the security policy table 270.

The input and output processing unit 28*c* receives various inputs of the user from the input unit 22, and transmits them to the policy processing unit 28*b* or the like. In the embodiment, the input and output processing unit 28*c* displays an input screen for inputting the certification key used in the encryption process in the default security policy on the display unit 21, receives an input of the certification key from the user on the screen, and transmits the input certification key to the policy processing unit 28*b*. The input and output processing unit 28*c* displays an input screen for inputting various settings in the security policy on the display unit 21, receives an input of the various settings of the security policy from the user, and transmits the input settings to the policy processing unit 28*b*. The print control unit 28*d* receives print data through the communication unit 23, and controls the print function unit 24 on the basis of the print data to form an image on the image forming medium.

The PC 3 includes a display unit 31, an input unit 32, a communication unit 33 as an example of a second communication unit, a ROM 34, a RAM 35, an HDD (Hard Disk Drive) 36, and a control unit 37.

The display unit 31 includes, for example, a liquid crystal screen to display various kinds of information. The input unit 32 includes, for example, a keyboard to receive an input such as various instructions from the user. When communication with the printer 2 is initially started, for example, the input unit 32 receives an input of the encryption method and the certification key set to the default security policy of the printer 2 or a designation of address information of the printer 2. The communication unit 33 performs a transmission or reception process of data to and from other devices through the network 4. In the embodiment, the communication unit 33 performs communication through the network 4 using an IP (Internet Protocol) packet (for example, also including an encrypted IPsec packet).

The ROM 34 stores a boot program and programs of various processes to be described later. The RAM 35 is used as an area for storing programs and data, or a work area for storing data used in a process performed by the control unit 37. The HDD 36 stores programs or various kinds of information. In the embodiment, the HDD 36 stores the security policy used in the IPsec and the security policy table managing the default security policy. The security policy table stored in the HDD 36 also has the same configuration as that of the security policy table 270 of the printer 2 shown in FIG. 2, and thus the description is omitted. To describe the security policy table stored in the HDD 36, the description uses the reference numerals and signs shown in FIG. 2 for convenience.

The control unit 37 includes a communication control unit 37*a*, a policy processing unit 37*b* as an example of a policy generating unit, and an input and output processing unit 37*c* as an example of a first encryption key receiving unit. The communication control unit 37*a*, the policy processing unit 37*b*, and the input and output processing unit 37*c* are configured, for example, by executing programs stored in the ROM 34, the HDD 36, or the like by a CPU as an example of the control unit 37.

The communication control unit 37*a* controls the communication unit 33 to perform communication through the network 4. The communication control unit 37*a* performs a process (packet process) on a transmission target packet (or a reception target packet) according to a policy reported by the policy processing unit 37*b*. The communication control unit 37*a* performs a process corresponding to the setting of the packet application process information 271*b* (or 272*a*) of the reported policy 271 (or 272).

Specifically, when the packet application process information 271*b* (or 272*a*) of the policy 271 (or 272) indicates the pass, the communication control unit 37*a* transmits the packet through the communication unit 33 when the packet is the transmission target packet, and receives the packet from the communication unit 33 to be usable in the process in the PC 3 when the packet is the reception target packet. When the packet application process information 271*b* (or 272*a*) of the policy 271 (or 272) indicates the block, the communication control unit 37*a* breaks the packet when the packet is the transmission target packet, and allows the communication unit 33 to break the packet when the packet is the reception target packet. When the packet application process information 271*b* (or 272*a*) of the policy 271 (or 272) indicates the encryption, the communication control unit 37*a* encrypts the packet using the certification key 271*c* (or 272*b*) by the encryption method indicated by the encryption parameter 271*d* (or 272*c*) and transmits it through the communication unit 33 when the packet is the transmission target packet, and the communication control unit 37*a* receives the packet from the communication unit 33 and decrypts the packet using the certification key 271*c* (or 272*b*) by the encryption method indicated by the encryption parameter 271*d* (272*c*) to use the decrypted packet in the process when the packet is the reception target packet. For example, when the packet is a packet corresponding to the web page for security policy setting, the communication control unit 37*a* transmits the packet to the input and output processing unit 37*c* to be usable. In the embodiment, when the communication control unit 37*a* receives the setting information (policy information) of the security policy in the printer 2 input corresponding to the web page for security policy setting from the input and output processing unit 37*c*, the communication control unit 37*a* encrypts the information according to the preset security policy for communication with the printer 2 and transmits it through the communication unit 33.

When the packet application process information 272*a* of the default security policy 272 indicates that the encryption and the certification key 272*b* is blank, the communication control unit 37*a* determines that it is not designated to be encrypted by the user. When the packet is the transmission target packet, the communication control unit 37*a* does not encrypt the packet and transmits the packet through the communication unit 33. When the packet is the reception target packet, the communication control unit 37*a* receives the packet from the communication unit 33 to be usable in the process without decryption.

When the packet is transmitted from the PC 3 and when the communication unit 33 receives the packet from the network 4, the policy processing unit 37*b* determines a policy (whether it is the security policy 271 or the default security policy 272) applied to the corresponding packet and reports the determination to the communication control unit 37*a*. In the embodiment, the policy processing unit 37*b* determines whether or not the security policies 271 are applicable in order from the top (sequentially from the security policy 1 shown in FIG. 2). When there is an applicable policy, the policy processing unit 37*b* reports it to the communication control unit 28*a*. When any security policies 271 are not applicable, the policy processing unit 37*b* determines the default security policy 272 as the applicable policy and reports it to the communication control unit 28*a*.

Specifically, the policy processing unit 37*b* specifies the IP address, the port number, and the protocol of the communication target device for the transmission target packet or the packet received by the communication unit 33, and determines whether or not there is the security policy 271 including the packet selector 271*a* with the content corresponding thereto. When there is the security policy 271 including the packet selector 271*a* with the corresponding content, the policy processing unit 37*b* reports the security policy 271 as the applied policy to the communication control unit 37*a*. Meanwhile, when there is no packet selector 271*a* with the corresponding content in any of the security policies 271, the policy processing unit 37*b* reports the default security policy 272 as the applied policy to the communication control unit 37*a*.

When the policy processing unit 37*b* receives the certification key in the default security policy from the input and output processing unit 37*c*, the policy processing unit 37*b* sets the received certification key as the certification key 272*b* of the default security policy 272 of the security policy table 270.

When the policy processing unit 37*b* receives the various settings (for example, the encryption method and certification key set as the default security policy of the printer 2, and the designation of the address information of the printer 2) in the security policy from the input and output processing unit 37*c*, the policy processing unit 37*b* newly sets the received security policy of the various settings as the security policy 271 (third security policy) of the security policy table 270. Accordingly, it is possible to perform the encryption communication with the printer 2 according to the security policy.

The input and output processing unit 37*c* displays an input screen for inputting the various settings (for example, the encryption method and certification key set as the default security policy of the printer 2, and the designation of the address information of the printer 2) in the security policy on the display unit 31, receives an input of the various settings of the security policy of the user from the input unit 32, and transmits the input settings to the policy processing unit 37*b*. When the encryption method in the default security policy does not depend on the printer and is determined to be common, the encryption method can be specified without inputting the encryption method. Accordingly, the input of the encryption method may not be received. When the input and output processing unit 37*c* receives the packet corresponding to the web page for security policy setting of the printer 2 from the communication control unit 37*a*, the input and output processing unit 37*c* displays the web page on the display unit 31 on the basis of the packet, receives an input of setting information (policy information: for example, address information of the PC 3, or the encryption method and certification key used in the PC 3) in the printer 2 from the user, and transmits the input setting information to the communication control unit 37*a*.

Next, a process operation in the communication system according to the embodiment of the invention will be described.

Figure 3:
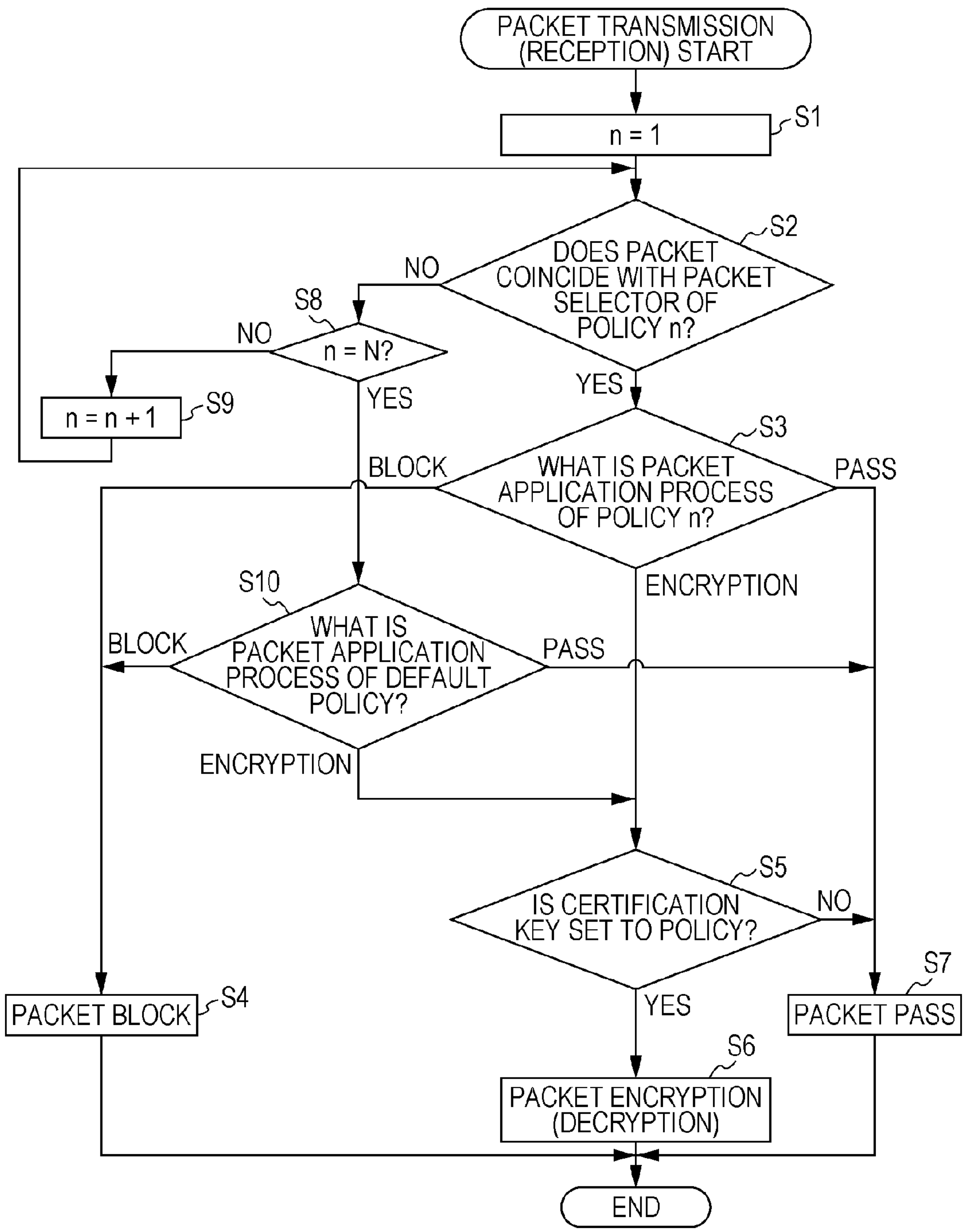
FIG. 3 is a flowchart illustrating a packet transmission (reception) process according to an embodiment of the invention.

FIG. 3 is a flowchart illustrating a packet transmission (reception) process according to an embodiment of the invention. In the packet transmission process and the packet reception process, there is only a difference that flowing directions of the packet are opposite to each other and the encryption process and the decryption process are switched, the other contents are the same, and thus these processes are herein described together. Since the packet transmission (reception) process in the printer 2 and the packet transmission (reception) process in the PC 3 are substantially the same process, the packet transmission (reception) process of the printer 2 is described and the description of the packet transmission (reception) process in the PC 3 is omitted.

In the printer 2, when the packet transmission (reception) process is started, the policy processing unit 28*b* sets a variable n to 1 (Step S1), and determines whether or not the communication target packet coincides with the setting of the packet selector 271*a* of the security policy n of the security policy table 270 (Step S2). The communication target packet is a transmission target packet generated in the printer 2 in the packet transmission process, and the communication target packet is a reception target packet received from the network 4 by the communication unit 23 in the packet reception process.

As a result of the determination of Step S2, when it is determined that the communication target packet coincides with the setting of the packet selector 271*a* of the security policy n (Step S2: Yes), it means that the security policy n is a security policy applied to communication. Accordingly, the policy processing unit 28*b* transmits the security policy n to the communication control unit 28*a*, and the communication control unit 28*a* confirms the setting of the packet application process information 271*b* of the security policy n (Step S3).

As a result of Step S3, when the packet application process information 271*b* of the security policy n indicates "block" (Step S3: Block), the communication control unit 28*a* blocks the packet of the communication target packet (Step S4) and ends the process. The block of the packet means, for example, that the transmission target packet is destroyed and not to be transmitted by the communication unit 23 in the packet transmission process, and the block of the packet means that the reception target communication packet is destroyed and not to be used in the internal process.

As a result of Step S3, when the packet application process information 271*b* of the security policy n indicates "encryption" (Step S3: Encryption), the communication control unit 28*a* determines whether or not the certification key is set in the security policy n (Step S5). When it is determined that the certification key is set (Step S5: Yes), the communication control unit 28*a* controls the encryption (decryption) process to be performed using the certification key by the encryption method indicated by the encryption parameter set in the security policy n, and controls the communication unit 23 to perform communication (Step S6). That is, the communication control unit 28*a* performs the encryption process on the transmission target packet and transmits it through the communication unit 23 in the packet transmission process, and the communication control unit 28*a* performs the decryption process on the reception target communication packet to be usable in the process of the control unit 28 in the packet reception process.

As a result of Step S3, when the packet application process information 271*b* of the security policy n indicates "pass" (Step S3: Pass) or when it is determined that the certification key is not set in Step S5 (Step S5: No), the packet is allowed to pass (Step S7). For example, the pass of the packet means that the transmission target packet is transmitted by the communication unit 23 as it is in the packet transmission process, and the pass of the packet means that the reception target communication packet is transmitted to the control unit 28 to be usable in the internal process as it is in the packet reception process.

Meanwhile, as a result of the determination of Step S2, when it is determined that the communication target packet does not coincide with the setting of the packet selector 271*a* of the security policy n (Step S2: No), the policy processing unit 28*b* determines whether or not the variable n is equal to the number N of stored security policies 271 in the security policy table 270 (Step S8). As a result, when it is determined that the variable n is not equal to the number N stored (Step S8: No), the policy processing unit 28*b* adds 1 to the variable n (Step S9) to determine whether or not it coincides with other security policies 271, and the process proceeds to Step S2.

Meanwhile, when it is determined that the variable n is equal to the number N stored (Step S8: Yes), it means that the communication target packet does not coincide with the setting of the packet selector 271*a* of all the security policies 271. Accordingly, the policy processing unit 28*b* transmits the default security policy 272 to the communication control unit 28*a*, and the communication control unit 28*a* confirms the setting of the packet application process information 272*a* of the default security policy 272 (Step S10).

As a result of Step S10, when the packet application process information 272*a* of the default security policy 272 indicates "block" (Step S10: Block), the communication control unit 28*a* blocks the communication target packet (Step S4) and ends the process.

As a result of Step S10, when the packet application process information 272*a* of the default security policy 272 indicates "encryption" (Step S10: Encryption), the process proceeds to Step S5. In later processes, when the certification key is not set in the default security policy, the encryption (decryption) process is not performed, and the communication target packet passes.

As a result of Step S10, when the packet application process information 272*a* of the default security policy 272 indicates "pass" (Step S10: Pass), the packet is allowed to pass (Step S7).

By such a packet transmission process (packet reception process), it is possible to easily perform the encryption process (decryption process) on the communication target packet without detailed setting as the security policy by setting the certification key in the default security policy 272, and it is possible to secure the security in communication.

Next, in the communication system 1, an operation of the policy setting process of setting the security policy to the printer 2 will be described.

Figure 4:
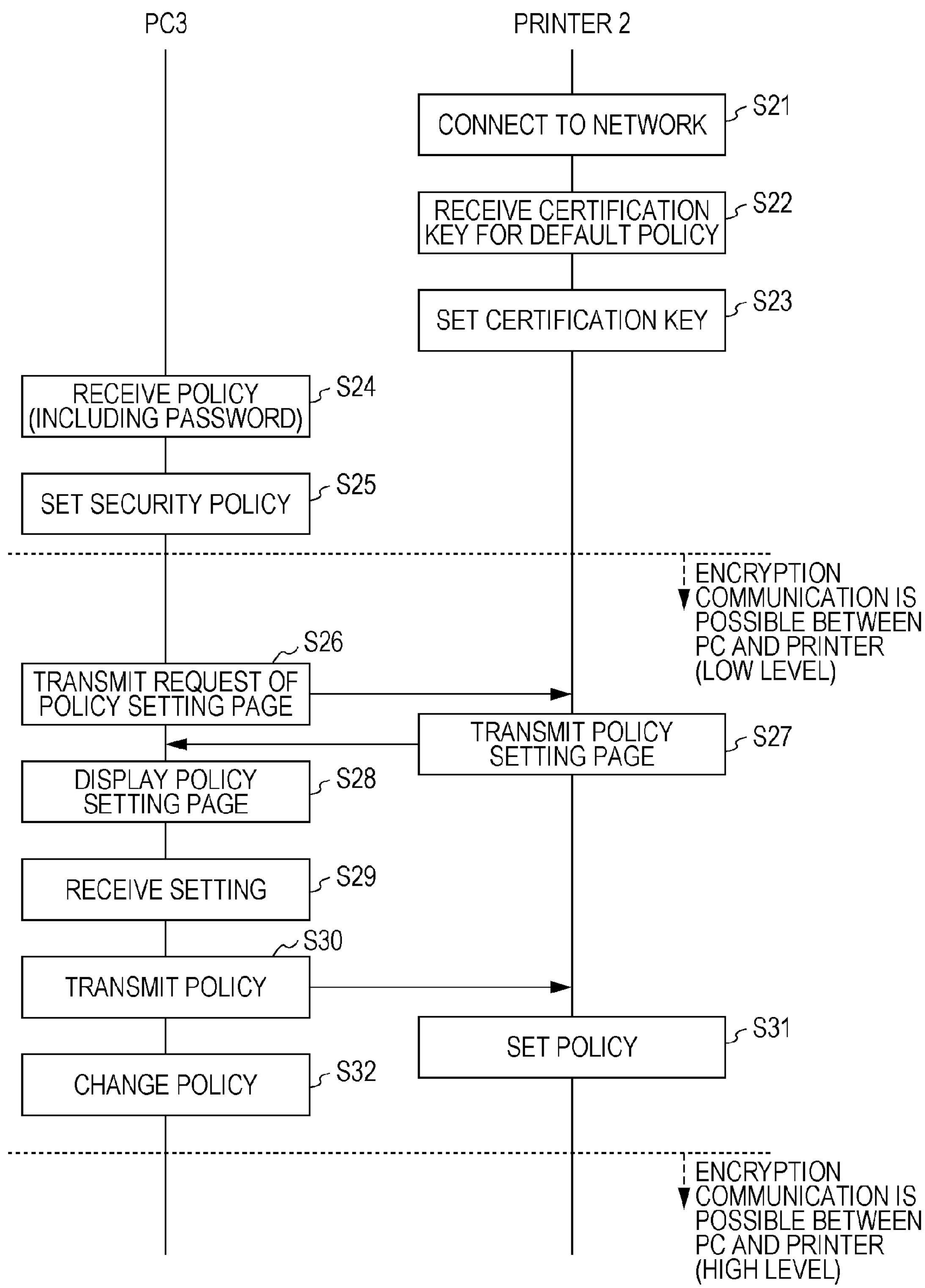
FIG. 4 is a diagram illustrating a policy setting process according to an embodiment of the invention.

FIG. 4 is a diagram illustrating the policy setting process according to the embodiment of the invention. FIG. 4 assumes the policy setting process when the printer 2 is newly connected to the network 4.

First, the printer 2 is connected to the network 4 (Step S21). The input and output processing unit 28*c* of the printer 2 displays a screen for setting the certification key set in the default security policy 272 on the display unit 21, and receives the certification key by the operation of the user to the input unit 22, and transmits the certification key to the policy processing unit 28*b* (Step S22). The policy processing unit 28*b* sets the received certification key in the security policy table 270 as the certification key 272*b* of the default security policy 272 (Step S23). Accordingly, in the printer 2, it becomes possible to perform the encryption communication using the set certification key by the encryption method set in the default security policy 272 with respect to the communication which does not coincide with the security policy 271.

Meanwhile, in the PC 3, the input and output processing unit 37*c* displays a screen for setting the security policy on the display unit 33 on the basis of the instruction of the security policy setting of the user by the input unit 32, and the input and output processing unit 37*c* receives the setting of the security policy applied to the communication with the printer 2 from the user, and transmits the setting to the policy processing unit 37*b* (Step S24). Here, the input and output processing unit 37*c* receives the address information (IP address, port number, and the like) of the printer 2, the encryption parameter, the certification key set for the printer 2, and the like, as the setting of the security policy. The policy processing unit 37*b* sets the security policy 271 in the security policy table 270 of the HDD 36 on the basis of the received setting (Step S25). Accordingly, in the PC 3, the set security policy 271 is applied to the communication with the printer 2. Accordingly, in the communication between the PC 3 and the printer 2, the encryption communication is performed using the encryption method and the certification key set in the default security policy of the printer 2.

Then, in the PC 3, the input and output processing unit 37*c* transmits a request of a policy setting page to the printer 2 through the communication control unit 37*a* and the communication unit 33 on the basis of a request instruction of the web page (policy setting page) for security policy setting in the printer 2 of the user by the input unit 32 (Step S26).

In the printer 2, when the input and output processing unit 28*c* receives the request of the policy setting page through the communication unit 23 and the communication control unit 28*a*, the policy setting page is transmitted to the PC 3 through the communication control unit 28*a* and the communication unit 23 (Step S27).

In the PC 3, the input and output processing unit 37*c* receives the policy setting page through the communication unit 33 and the communication control unit 37*a*, and displays the policy setting page on the display unit 31 (Step S28). Then, the input and output processing unit 37*c* receives information, which has to be set by the user, of information (policy information) necessary for setting of the security policy in the printer 2 by the operation of the user to the input unit 32 (Step S29). As the policy information, for example, there are the parameter of the encryption method used later, the certification key used in the encryption process, and the address information of the PC 3. As the information which has to be set by the user, for example, there are the encryption method and the certification key. In the embodiment, it is not necessary to input the address information of the PC 3 by the user since the PC 3 itself can be grasped by the address information. Here, as the encryption method received from the user, an encryption method with a high security level is more preferable than the encryption method of the default security policy. The input and output processing unit 37*c* transmits the policy information to the printer 2 through the communication control unit 37*a* and the communication unit 33 (Step S30). At the transmitting time, the policy information is encrypted by the same encryption method and certification key as those of the default security policy of the printer 2.

In the printer 2, the policy processing unit 28*b* receives the policy information through the communication unit 23 and the communication control unit 28*a*, and sets the security policy 271 applied to the communication with the PC 3 in the later communication to the security policy table 270 of the EEPROM 27 on the basis of the policy information (Step S31). Accordingly, in the later communication with the PC 3, the encryption communication is performed according to the security policy 271 of the security policy table 270.

In the PC 3, the policy processing unit 37*b* changes the security policy 271 set to be applied to the communication with the printer 2, so as to correspond to the policy information including the information input to the policy setting page, that is, the encryption method and the certification key of the security policy 271 are changed to the encryption method and the certification key included in the policy information (Step S32). Accordingly, in the communication between the PC 3 and the printer 2, the encryption communication by the encryption method and the certification key newly set for the PC 3 is applied, and thus it is possible to improve the security level of the encryption.

According to the above-described process, by not only setting the certification key in the printer 2 but also by inputting the setting necessary as the security policy of the printer 2 in the PC 3, the security policy in the printer 2 can be set easily. In the communication when setting the security policy to the printer 2, the encryption communication based on the default security policy is performed, and thus it is possible to appropriately prevent the policy information in the communication from being leaked.

The invention has been described above with reference to the embodiment, but the invention is not limited to the above-described embodiment, and may be applied to other various aspects.

For example, in the embodiment, in the printer 2, the user may arbitrarily set the certification key, but for example, the certification key may be set in advance in the printer 2, or the printer 2 may automatically determine the certification key. In this case, it is preferable that the certification key is displayed on the display unit 21 for a user to recognize the certification key, and the certification key is input by the PC 3.

In the embodiment, the default security policy is prepared and the encryption process may be performed according to the default security policy in the communication to which the security policy is not applied, but the invention is not limited thereto, and a security policy covering all the communication assumed for the device (for example, the printer 2), for example, a security policy (an example of the second security policy), in which an address of the whole range (communication target range) assumed when there is a probability of communicating by the printer 2 is set to the IP address of the packet selector and the encryption is designated, may be prepared.

In the embodiment, the printer has been described as the first communication device by way of example, but the first communication device is not limited thereto, and the first communication device may be, for example, a multifunction device provided with a printer, a facsimile, a scanner, and the like, and may be a scanner and a personal computer. The important point is that the first communication device is a communicable communication device. In addition, the second communication device may be the communicable communication device.

The entire disclosure of Japanese Patent Application No. 2010-084806, filed Apr. 1, 2010 is expressly incorporated by reference herein.

What is claimed is:

1. A communication system comprising a first communication device and a second communication device connected through a network, the first communication device and the second communication device performing a communication process on the basis of a security policy set for each device, wherein the first communication device includes a security policy storing unit that is able to store a first security policy including an encryption method and an encryption key applied to predetermined communication with a predetermined communication device in a predetermined communication target range and a second security policy including an encryption method and an encryption key applied to all communication to which the first security policy in the communication target range is not applied, the second security policy being set by a user and inputted via an input unit of the first communication device, a first communication unit that performs communication of a communication packet with other communication devices through the network, and a first encryption processing unit that performs an encryption process on the transmitted communication packet and a decryption process of the received communication packet according to the second security policy when it is determined that the first security policy does not apply to other communication devices, and wherein the second communication device includes a first encryption key receiving unit that receives an input of the encryption key stored in the second security policy of the first communication device, the first encryption key being inputted via an input of the second communication device, a policy generating unit that generates a third security policy including the encryption method of the second security policy and the input encryption key, a second encryption processing unit that performs an encryption process on the communication packet transmitted to the first communication device and a decryption process of the communication packet received from the first communication device according to the third security policy, and a second communication unit that performs communication of the communication packet with the first communication device through the network.

2. The communication system according to claim 1, wherein the second communication device further includes a policy information receiving unit that receives policy information prescribing the security policy stored in the first communication device from a user, wherein the second encryption processing unit generates a communication packet obtained by performing an encryption process on the packet including the policy information according to the third security policy, wherein the second communication unit transmits the generated communication packet to the first communication device, wherein the first communication unit of the first communication device receives the communication packet, wherein the first encryption processing unit generates a packet obtained by decryption the received communication packet according to the second security policy, and wherein the first communication device further includes a policy generating unit that generates a security policy applied to communication with the second communication device as one of the first security policies on the basis of the policy information included in the decrypted packet.

3. The communication system according to claim 1, wherein the first encryption processing unit of the first communication device does not perform the encryption process on the transmitted communication packet and the decryption process of the received communication packet, when the encryption key is not stored as the second security policy and the communication with other communication devices does not correspond to the target to which the first security policy is applied.

4. The communication system according to claim 1, wherein the second security policy is a security policy in which an applicable communication device is not limited.

5. The communication system according to claim 1, wherein the second security policy is a security policy applicable to all communication devices in the communication target range.

6. A communication device performing communication with other communication devices through a network, comprising:

a security policy storing unit that is able to store a first security policy including an encryption method and an encryption key applied to predetermined communication with a predetermined communication device in a predetermined communication target range and a second security policy including an encryption method and an encryption key applied to all communication to which the first security policy in the communication target range is not applied, the second security policy being set by a user and inputted via an input unit of the communication device;

a first communication unit that performs communication of a communication packet with other communication devices; and a first encryption processing unit that performs an encryption process on the transmitted communication packet and a decryption process of the received communication packet according to the second security policy when it is determined that the first security policy does not apply to the other communication devices, the other communication devices receiving the encryption key via an input in the other communication devices.

7. A communication method in a communication system including a first communication device and a second communication device connected through a network, the first communication device and the second communication device performing a communication process on the basis of a security policy set for each device, wherein the first communication device includes a security policy storing unit that is able to store a first security policy including an encryption method and an encryption key applied to predetermined communication with a predetermined communication device in a predetermined communication target range and a second security policy including an encryption method and an encryption key applied to all communication to which the first security policy in the communication target range is not applied, the second security policy being set by a user and inputted via an input unit of the first communication device, the communication method comprising:

receiving an input of the encryption key stored in the second security policy of the first communication device by a user input of the second communication device comprising an first encryption key receiving unit;

generating a third security policy including the encryption method of the second security policy and the input encryption key by a policy generating unit of the second communication device;

performing an encryption process on the communication packet transmitted to the first communication device and a decryption process of the communication packet received from the first communication device according to the third security policy by a second encryption processing unit of the second communication device;

performing communication of the communication packet with the first communication device through the network by a second communication unit of the second communication device;

performing communication of the communication packet with the second communication device through the network by a first communication unit of the first communication device; and performing the encryption process on the transmitted communication packet and the decryption process of the received communication packet according to the second security policy by a first encryption processing unit of the first communication device, when it is determined that the first security policy does not apply to the second communication device.

* * * * *